(12) United States Patent
Li

(10) Patent No.: US 8,891,584 B2
(45) Date of Patent: Nov. 18, 2014

(54) SHAFT HIGH TEMPERATURE CONTINUOUS GRAPHITIZING FURNACE

(75) Inventor: Yinghe Li, Hunan (CN)

(73) Assignee: Miluo Xinxiang Carbon Products Co., Ltd, Miluo, Hunan Province (CN)

( * ) Notice: Subject to any disclaimer, the term of this patent is extended or adjusted under 35 U.S.C. 154(b) by 886 days.

(21) Appl. No.: 13/021,528

(22) Filed: Feb. 4, 2011

(65) Prior Publication Data
US 2011/0194583 A1 Aug. 11, 2011

(30) Foreign Application Priority Data
Feb. 10, 2010 (CN) ............... 2010 1 0108180

(51) Int. Cl.
*F27D 9/00* (2006.01)
*H05B 11/00* (2006.01)
(Continued)

(52) U.S. Cl.
CPC . *C01B 31/04* (2013.01); *F27B 1/08* (2013.01); *F27B 1/10* (2013.01); *F27B 1/20* (2013.01);
(Continued)

(58) Field of Classification Search
CPC .... C21C 2250/06; C04B 20/066; C04B 2/12; C04B 2/106; C04B 33/138; B01J 6/00; H05B 6/22; H05B 6/367; H05B 7/148
USPC .......... 373/113, 2, 3, 8, 9, 33, 36, 62, 63, 68, 373/74, 76, 79, 81, 82, 93; 65/126–132; 219/121
See application file for complete search history.

(56) References Cited

U.S. PATENT DOCUMENTS

| 386,269 A | * | 7/1888 | Sahler | 266/138 |
| 1,675,744 A | * | 7/1928 | Baily | 373/3 |

(Continued)

FOREIGN PATENT DOCUMENTS

CN 201201900 Y 3/2009

OTHER PUBLICATIONS

Shi Chuanyang, Tang Qingshan and Huang Jun; The Application of Double Alkaline Water in Flue Gas Dust and Sulfur Removal; Chinese Journal of Environmental Health; 2001; pp. 26-28; 4th volume, 3rd issue; China.

*Primary Examiner* — Dana Ross
*Assistant Examiner* — Gyounghyun Bae
(74) *Attorney, Agent, or Firm* — McGarry Bair PC

(57) ABSTRACT

The present invention provides a shaft high temperature continuous graphitizing furnace comprising a furnace body comprising a feeding inlet and a discharging outlet, an electrode pair, a cooling system and a discharging device; the furnace body is designed to be a shaft cylindrical structure; the electrode pair is provided within the furnace body and comprise an upper electrode and a lower electrode, the upper electrode is located below the feeding inlet, and an umbrella or cone table shape electric field having a lower cross section area greater than its upper cross section area arises between the upper electrode and eh lower electrode; and the cooling system is located between the lower electrode and the discharging outlet. For the shaft high temperature continuous graphitizing furnace of the present invention, a perpendicularly placed column electrode is used as the upper electrode, a horizontally placed circular hollow electrode is used as the lower electrode, an umbrella high temperature area is formed between the electrode pair, and the natural flow law of an object is used to have materials pass a high temperature graphitizing area and then discharged, which ensures the quality of the product.

9 Claims, 2 Drawing Sheets

(51) Int. Cl.
*F27D 17/00* (2006.01)
*C03B 3/00* (2006.01)
*C03B 5/027* (2006.01)
*H05B 7/22* (2006.01)
*F27B 14/04* (2006.01)
*F27D 1/02* (2006.01)
*F27D 1/12* (2006.01)
*F27D 3/00* (2006.01)
*H05B 7/06* (2006.01)
*C03B 5/26* (2006.01)
*C01B 31/04* (2006.01)
*F27B 1/08* (2006.01)
*F27B 1/10* (2006.01)
*F27B 1/20* (2006.01)
*F27B 1/24* (2006.01)
*F27D 3/10* (2006.01)

(52) U.S. Cl.
CPC ............... *F27B 1/24* (2013.01); *F27D 3/0027* (2013.01); *F27D 3/0033* (2013.01); *F27D 3/10* (2013.01); *F27D 9/00* (2013.01)
USPC ............ 373/113; 373/2; 373/3; 373/8; 373/9; 373/33; 373/36; 373/62; 373/63; 373/68; 373/74; 373/76; 373/79; 373/81; 373/82; 373/93; 65/126; 65/127; 65/128; 65/129; 65/130; 65/131; 65/132

(56) References Cited

U.S. PATENT DOCUMENTS

| | | | | |
|---|---|---|---|---|
| 1,763,248 | A * | 6/1930 | Moore | 266/217 |
| 1,980,825 | A * | 11/1934 | Rankin | 373/112 |
| 2,994,801 | A * | 8/1961 | Hanks | 315/14 |
| 3,205,292 | A * | 9/1965 | Descarsin | 373/27 |
| 3,448,973 | A * | 6/1969 | Derham | 266/151 |
| 3,895,174 | A * | 7/1975 | Jung | 373/111 |
| 3,905,589 | A * | 9/1975 | Schempp et al. | 266/222 |
| 3,954,254 | A * | 5/1976 | Zimmermann | 266/188 |
| 4,197,278 | A * | 4/1980 | Gehri et al. | 423/243.08 |
| 4,374,652 | A * | 2/1983 | Zahedi et al. | 95/69 |
| 4,637,033 | A * | 1/1987 | Buhler | 373/72 |
| 4,668,489 | A * | 5/1987 | Alexander et al. | 423/240 R |
| 4,738,938 | A * | 4/1988 | Kunkle et al. | 501/72 |
| 5,046,144 | A * | 9/1991 | Jensen | 219/121.36 |
| 5,237,585 | A * | 8/1993 | Stenkvist | 373/72 |
| 5,290,334 | A * | 3/1994 | Alexander | 65/335 |
| 5,312,471 | A * | 5/1994 | Jung | 65/17.4 |
| 5,636,240 | A * | 6/1997 | Tsai et al. | 373/27 |
| 5,992,503 | A * | 11/1999 | Knudsen et al. | 164/513 |
| 6,038,247 | A * | 3/2000 | Mochizuki | 373/120 |
| 6,061,384 | A * | 5/2000 | Koslow | 373/109 |
| 2002/0088253 | A1* | 7/2002 | Roba et al. | 65/481 |
| 2007/0295701 | A1* | 12/2007 | Bodroghkozy et al. | 219/121.52 |
| 2008/0069945 | A1* | 3/2008 | Horne et al. | 427/64 |
| 2011/0194583 | A1* | 8/2011 | Li | 373/113 |

* cited by examiner

SHAFT HIGH TEMPERATURE CONTINUOUS GRAPHITIZING FURNACE

CROSS-REFERENCE TO RELATED APPLICATIONS

This application claims the benefit of Chinese Patent Application No. 201010108180.7, filed Feb. 10, 2010, which is incorporated herein by reference in its entirety.

TECHNICAL FIELD

The present invention relates to a shaft high temperature continuous graphitizing furnace.

BACKGROUND ART

Carbon atoms of carbon materials are in an irregular arrangement, and only by subjecting the carbon atoms to a high temperature treatment of 2200~2600° C. to make the carbon atoms re-crystallize and orderly rearrange can the carbon materials present the crystal structure of graphite and have many fine performances of graphite. For example, the conductivity and thermal conductivity are improved obviously, the chemical and thermal stabilities become better, the impurities are decreased, the hardness is reduced, the machining properties become better, etc. The function of graphitizing furnace is to convert carbon materials into man-made graphite materials, for example, graphite materials providing excellent carbon elements for steel smelting, aluminum smelting, cathode material, other non-ferrous metal industries, and nuclear industry, etc.

Currently, the most widely used graphitizing furnace is Acheson furnace. The Acheson furnace has an open rectangular furnace body structure. During production, the carbon materials are arranged longitudinally or transversely, and metallurgical coke and quartz sand are filled around them. Power is supplied along the length direction of the furnace body, and heat is generated utilizing the resistance of the coke, and finally the heated objects generate resistance and generate heat; lining materials such as coke powder, carbon black, a mixture of silica sand/coke/silicon carbide, are used for heat shielding around the coke for heat insulation.

Main shortcomings of the current Acheson furnace are as follows:

1. The Acheson furnace has a horizontal and open structure, so it has serious heat consumption. The variable unit consumption of the electrical energy consumption is 20-40 GJ/T and the product purity is not high.

2. The cooling period of the furnace body lasts long. The graphitizing process takes 2-7 days by heating of electricity, but it takes about two weeks to cool large amounts of coke filler, and performing forced cooling by spraying water brings much pollution to the environment and the efficiency is low.

3. The product is not heated uniformly. The temperature at the center of the product reaches 2600° C., while the peripheral temperature is only about 1000C., which results in non-uniform graphitization and unstable quality of the product.

4. Sulfur dioxide gas emitted during a high temperature process cannot be collected and treated, which results in environmental pollution.

In view of the above discussion, the Acheson furnace of the prior art cannot meet the demands of energy saving and emission reducing, operation safety and stability of product quality.

SUMMARY OF THE INVENTION

The purpose of the present invention is to provide a shaft high temperature continuous graphitizing furnace to solve the above problems.

According to one aspect of the present invention, a shaft high temperature continuous graphitizing furnace is provided, wherein it comprises a closed furnace body, a cooling area below the furnace body, a discharging outlet below the cooling area, a discharging device connected with the discharging outlet, and a cooling system connected with the cooling area; the furnace body being designed to be a shaft cylindrical structure; the furnace body having a feeding inlet at its upper end; the furnace body being provided with an electrode pair; the electrode pair comprises an upper electrode being located at the top of the furnace body and a lower electrode being located at the bottom of the furnace body, and an umbrella or truncated cone shaped electric field having a lower cross section area greater than its upper cross section area arises between the upper electrode and the lower electrode.

Preferably, the electrode pair is graphite electrode, the upper electrode is a perpendicularly placed column electrode, and the lower electrode is a horizontally placed annular hollow electrode.

Preferably, the electrode pair is distributed at the center axis of the furnace body.

Preferably, the cooling system is a circulating water cooling system.

Preferably, the shaft high temperature continuous graphitizing furnace further comprises a feeding device which conveys materials to the feeding inlet, and the feeding device is disposed outside the furnace body and driven by hydraulic power or mechanical power.

Preferably, the shaft high temperature continuous graphitizing furnace further comprises a high temperature buffer area connected between the furnace body and the cooling area.

Preferably, the shaft high temperature continuous graphitizing furnace further comprises a flue connected with the furnace body, and a desulfurizing device connected between the flue and the furnace body.

Preferably, the flue performs dust removal and desulfurization to smoke through the desulfurizing device using a dual-alkali water curtain, and the desulfurizing device uses sodium carbonate and sodium hydroxide to regenerate clean water.

Preferably, the flue of the furnace body are in a circular four-hole shape, and the discharging device uses an automatic control system.

Preferably, a high power direct current transmission manner is adopted between the upper electrode and the lower electrode to form an umbrella or truncated cone shaped electric field.

Preferably, the feeding inlet and the furnace body form an inverted umbrella or inverted truncated cone shaped material falling area.

An umbrella shaped high temperature area is formed between the upper electrode and the lower electrode of the shaft high temperature continuous graphitizing furnace, and matches the natural shape and regional distributions formed by the falling of raw materials and is consistent with the law of natural flow of the object, so that the raw materials will be discharged via the high temperature graphitizing area as a necessity, which ensures that the raw materials in each area can be heated during the falling, and so the material is heated uniformly and the product quality can be ensured. In addition, within the closed furnace body, a high temperature pre-heating area is naturally formed at the upper portion of the umbrella shaped high temperature area, so that the raw materials are preheated effectively, heat energy is used efficiently, and the effect of energy saving is prominent; also, the closed structure of the furnace body allows no impurities to be blended into the raw materials during the graphitizing process, so the purity of the product is high.

BRIEF DESCRIPTION OF THE DRAWINGS

The accompanying drawings, which are included to provide a further understanding of the invention and are incorporated in and constitute a part of this specification, illustrate embodiments of the invention and together with the description to explain the principles of the invention, and do not form inappropriate limitations to the invention. In the accompanying drawings.

Figure 1:
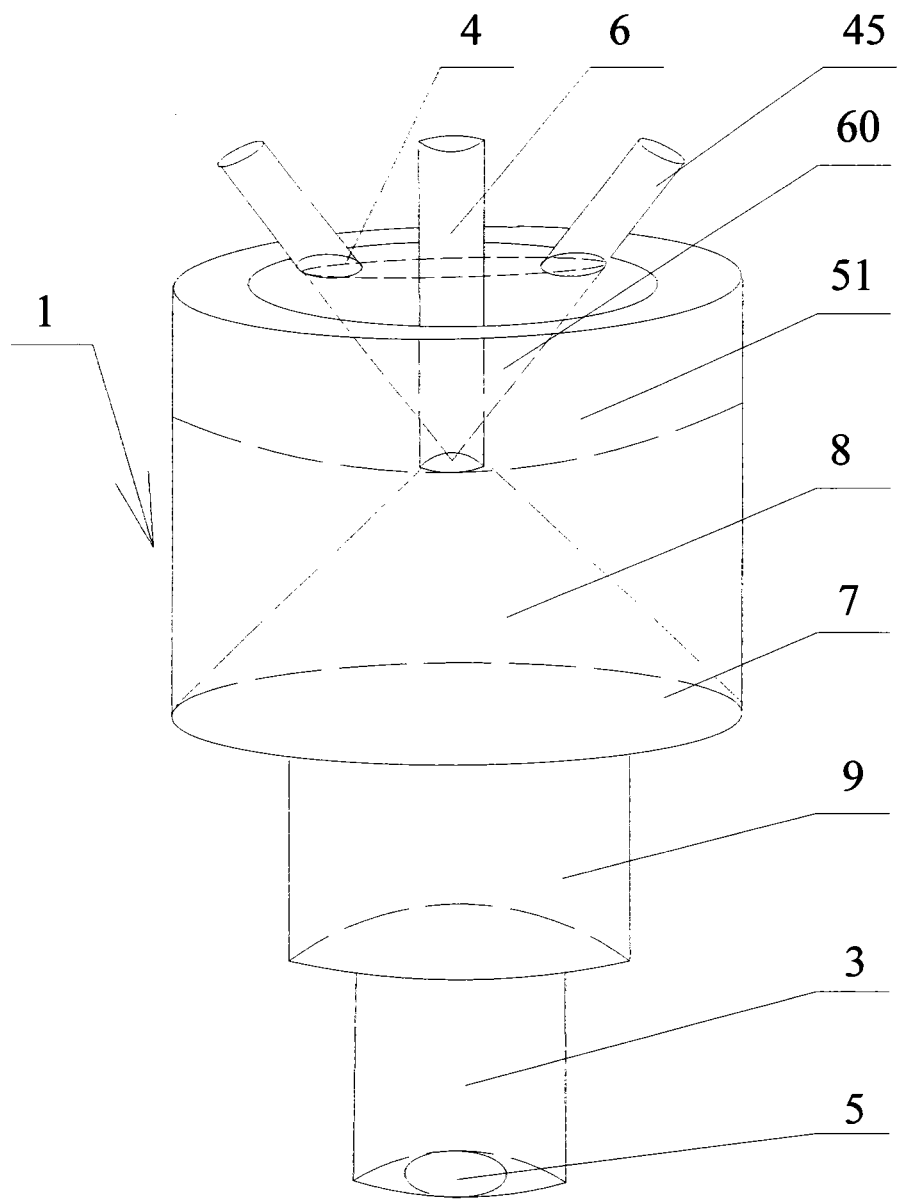
FIG. 1 is a schematic view of the structure of the furnace body of the graphitizing furnace according to a schematic embodiment of the present invention.

Label declaration: furnace body 1, cooling area 3, feeding inlet 4, discharging outlet 5, upper electrode 6, lower electrode 7, umbrella or truncated cone shaped electric field 8, high temperature buffer area 9, feeding device 13, dust removal device 14, desulfurizing device 15, flue 16, flue outlet 161, distributing device 20, raw material 30, discharging device 41, material guiding pipe 45, preheating area 51, material falling area 60.

DETAILED DESCRIPTION OF THE INVENTION

The present invention is described hereinafter with reference to the embodiments as well as the drawings.

In the following, detailed description of the present invention will be given with reference to FIGS. 1 and 2.

A shaft high temperature continuous graphitizing furnace according to a schematic embodiment of the present invention comprises a closed furnace body 1, a cooling area 3 below the furnace body, a discharging outlet 5 below the cooling area, a discharging device 41 connected with the discharging outlet 5, and a cooling system connected with the cooling area 3; the furnace body 1 is designed to be a shaft cylindrical structure; the furnace body has a feeding inlet 4 at its upper end; the furnace body is provided with an electrode pair; the electrode pair comprises an upper electrode 6 and a lower electrode 7, the upper electrode 6 of which is located at the top of the furnace body 1, for example, the upper end of the upper electrode 6 is provided above the top end of the furnace body 1 to connect a power supply, and the lower end of the upper electrode 6 is provided below the top end of the furnace body 1 and is usually below the feeding inlet 4, the lower electrode 7 of which is located at the bottom of the furnace body 1, for example, the electrode pair comprises a perpendicularly placed column upper electrode and a horizontally placed circular lower electrode 7, and an umbrella or truncated cone shaped electric field 8 having a lower cross section area greater than its upper cross section area arises between the upper electrode and the lower electrode so as to form an umbrella or truncated cone shaped high temperature area.

An umbrella shaped high temperature area is formed between the upper electrode 6 and the lower electrode 7 of the shaft high temperature continuous graphitizing furnace, and matches the natural shape and regional distributions formed by the falling of raw materials and is consistent with the law of natural flow of the object, so that the raw materials will be discharged via the high temperature graphitizing area as a necessity, which ensures that the raw materials in each area can be heated during the falling, and so the material is heated uniformly and the product quality can be ensured. In addition, within the closed furnace body, a high temperature pre-heating area 51 is naturally formed at the upper portion of the umbrella shaped high temperature area, so that the raw materials are preheated effectively, heat energy is used efficiently, and the effect of energy saving is prominently; also, the closed structure of the furnace body allows no impurities to be blended into the raw materials during the graphitizing process, so the purity of the product is high.

The furnace body 1 has a cylindrical structure and is closed with respect to the present open heating furnaces, or at least the furnace body 1 is closed at the side surface. That is, except the feeding inlet 4 and other necessary connection devices, there is no other channel that allows the entrance of impurities, which prevents impurities other than the raw materials from entering into the furnace body and ensures purity of the product. The feeding inlet 4 is located at the center of the top part of the furnace body 1, above which a cover can be provided to cover the furnace body. The discharging outlet 5 is located at the bottom of the graphitizing furnace, for example, at the center of the bottom of the graphitizing furnace. The cross section area of the feeding inlet 4 is larger than that of the upper electrode 6 so that the raw materials are attached to the surface of the upper electrode 6 and then enters into the furnace body 1, which effectively lowers the conductivity temperature of the upper electrode.

Further, the feeding inlet 4 and the furnace body 1 form an inverted umbrella or inverted truncated cone shaped material falling area 60. As shown in FIG. 1, a material guiding device such as a material guiding plate or material guiding pipe is provided on the feeding inlet 4, and in this embodiment a material guiding pipe 45 is adopted. The furnace body 1 can be provided with multiple feeding inlets 4, for example, three, four, five, six, etc. The material guiding pipe 45 is obliquely provided at the feeding inlet 4, the direction of the material guiding pipe 45 forms an acute angle with the center axis of the furnace body 1 so that the feeding inlet 4 and the furnace body 1 form an inverted umbrella or inverted truncated cone shaped material falling area 60. In this way the raw materials are fed conveniently. The raw materials fall onto the inverted umbrella or inverted truncated cone shaped material falling area 60 through the feeding inlet 4, and the shape of the inverted umbrella or inverted truncated cone shaped material falling area 60 is corresponded to the shape of the umbrella or cone table shaped high temperature area 8. The cross section of the shape of the falling raw materials gradually increases from the top to the bottom, for example, the falling cross section of the raw materials is the tip part of the umbrella at the beginning and then is the cross section of the middle part of the umbrella. The cross section of the high temperature area 8 also increases gradually, which is the tip part of the umbrella at the beginning and then is the cross section of the middle part of the umbrella. Thus the cross section of the shape of the falling raw materials coincides with that of the high temperature area 8, so the energy of the electrodes is utilized to the greatest advantage and the waste of the energy is low, then much power can be saved and cost is lowered. The amount of the power used is shown in the following table 2.

The electrode pair is located at the center axis of the furnace body, and the center axis of the upper electrode 6 coincides with that of the lower electrode 7. The upper electrode 6 and the lower electrode 7 can be provided specifically in the furnace body with reference to the prior art, which is not the key point of the present invention, so it is not described in particular. The upper electrodes 6 can be provided in a way that multiple pairs of the upper electrodes are provided around the center axis of the lower electrodes 7, in this way the formed electric field is usually in a truncated cone shaped and the heating area is wider. The number of the upper electrodes can be determined according to actual situations, for example, the upper electrodes can be one pair or multiple pairs, which will not affect the implement of the present invention.

A high power direct current transmission manner is adopted between the upper electrode 6 and the lower electrode 7 to form an umbrella or truncated cone shaped electric field 8. The direct current does not have alternating magnetic field and inductance loss, nor have electric losses such as surface effect and proximity effect, so the utilization of electric power is high and energy is saved.

The Joule heat generated in the umbrella or truncated cone shaped electric field 8 enables the temperature of the area covered by the umbrella or truncated cone shaped electric field 8 to reach the temperature of 2200-2600° C., and an umbrella or truncated cone shaped high temperature area is formed. According to the heat flux effect, a high temperature preheating area 51, for example, in a column shape, is formed above the umbrella or truncated cone shaped high temperature area, and the height of the column space, for example, can be the height from the feeding inlet 4 to the lower end of the upper electrode 6. The height of the high temperature preheating area 51 is about 5% to 30% of the height of the furnace body 1, for example, 5%, 10%, 12%, 15%, 18%, 20%, 22%, 25% and 30% of the height of the furnace body, in which the raw materials are preheated at a temperature of about 1300-2200° C. before they enters the umbrella or truncated cone shaped high temperature area 8. So the impurity elements in the carbon materials are volatilized in advance, new atom bonds are established between adjacent hexagonal annular plate bodies, and the graphitizing period of the carbon materials during the falling is prolonged. So heat energy is effectively used, and the graphitizing degree of the product is improved.

The umbrella or truncated cone shaped electric field high temperature area 8 with a narrower upper portion and a wider lower portion can be formed between a perpendicularly placed column upper electrode 6 and a horizontally placed circular hollow lower electrode 7, so that the raw materials can enter the high temperature segment of the electric field sufficiently. The graphitizing degree of the product is high, and the quality of the product is stable. Thus, the shapes and materials of the upper electrode 6 and the lower electrode 7 will not affect the implementation of the embodiment of the present invention as long as the umbrella or truncated cone shaped electric field high temperature area 8 is formed between the upper electrode 6 and the lower electrode 7. Preferably, the upper electrode 6 is a high power graphite electrode, and the lower electrode 7 is a high power fine-grained graphite ring.

The cathode connecting line of the lower electrode 7 can be led in from the side surface of the furnace body 1, which will not affect the implementation of the embodiment of the present invention.

The lining of the furnace body 1 adopted refractory material with fine performances to effectively protect the furnace body 1 and prevent the electric field within the furnace body 1 from being interfered by external factors, ensuring the relative centralization and stability of the electric field high temperature area.

The specific performance parameters of the refractory material are shown in the following table 1.

TABLE 1

Performances of the lining material of the furnace

| Bulk density (g/cm3) | Thermostability (° C.) | Resistance (μΩm) | Compressive strength (MPa) | Thermal conductivity (W/mK) |
|---|---|---|---|---|
| 1.30 | 2800 | 300 | 57 | 10 |

The shaft graphitizing furnace of the present invention has low thermal loss and high thermal utilization, and has prominent effect of saving energy. The comparison of power consumption between the present invention and various existing graphitizing furnaces is shown in the following table 2.

TABLE 2

Comparison of power consumption between the graphitizing furnace of the present invention and existing graphitizing furnaces

| Name | Acheson graphitizing furnace | Graphitizing furnace in series connection | Graphitizing furnace of the present invention |
|---|---|---|---|
| Power consumption | 3800-4500 KWH/ton | 3000-4000 KWH/ton | 1460 KWH/ton |

From table 2, when the graphitizing furnace of the present invention is used, the power consumption per ton is only 1460 KWH and is much lower than the various graphitizing furnaces existing.

The present invention can use a pollution-free circulating water cooling system. The circulating water cooling system may comprise a cooling area 3 provided in the furnace body, a circulating water pool and a cooling water tower provided outside the furnace body, a cooling water pipe provided in the cooling area 3, and various parts such as connecting pipes (not shown), and the cooling water pipe is connected with the circulating water pool and the cooling water tower. The cooling area 3 is located below the furnace body, for example, the cooling area 3 is located between the lower electrode 7 and the discharging outlet 5. The cooling area 3 may be in a column shape, which is convenient for the production thereof. The cooling area 3 can be smaller than the furnace body 1 in diameter, wherein the diameter of the cooling area 3 can be 40% to 70% of the diameter of the furnace body 1, for example, 40%, 50%, 60% and 70%.

Further, the shaft high temperature continuous graphitizing furnace comprises a high temperature buffer area 9 which is provided between the furnace body 1 and the cooling area 3 and is a transition area connecting the furnace body 1 and the cooling area 3. The high temperature buffer area 9 is a space between the lower electrode and the cooling system and is usually a column space provided for the preliminary cooling of the product in high temperature, and the cooling does not need the cooling system but depends on the temperature difference between the upper and lower portions of the furnace body. The high temperature buffer area 9 utilizes the natural flow law of an object, and the product in high temperature naturally falls into the high temperature buffer area 9. The height of the column space of the high temperature buffer area 9 is determined according to actual needs, for example, the height of the column space is 20% to 80% of the height of the furnace body, preferably 50% to 80%, for example, 70% and 80%. In this way, the cooling water is not in direct contact with the lower electrode 7, which protects the lower electrode 7, lowers the temperature of the high temperature product, reduces the amount of the water used in subsequent cooling process, effectively saves water and obviously alleviates environmental pollution.

The high temperature buffer area 9 can also be provided in a column shape, and its diameter can be 50% to 90% of the diameter of the furnace body 1, for example, 50%, 50%, 60% or 70%, 80% or 90%. As shown in FIGS. 1 and 2, the furnace body 1, the high temperature buffer area 9 and the cooling area 3 are sequentially connected, and the diameters thereof decrease sequentially, which is useful for the cooling.

Figure 2:
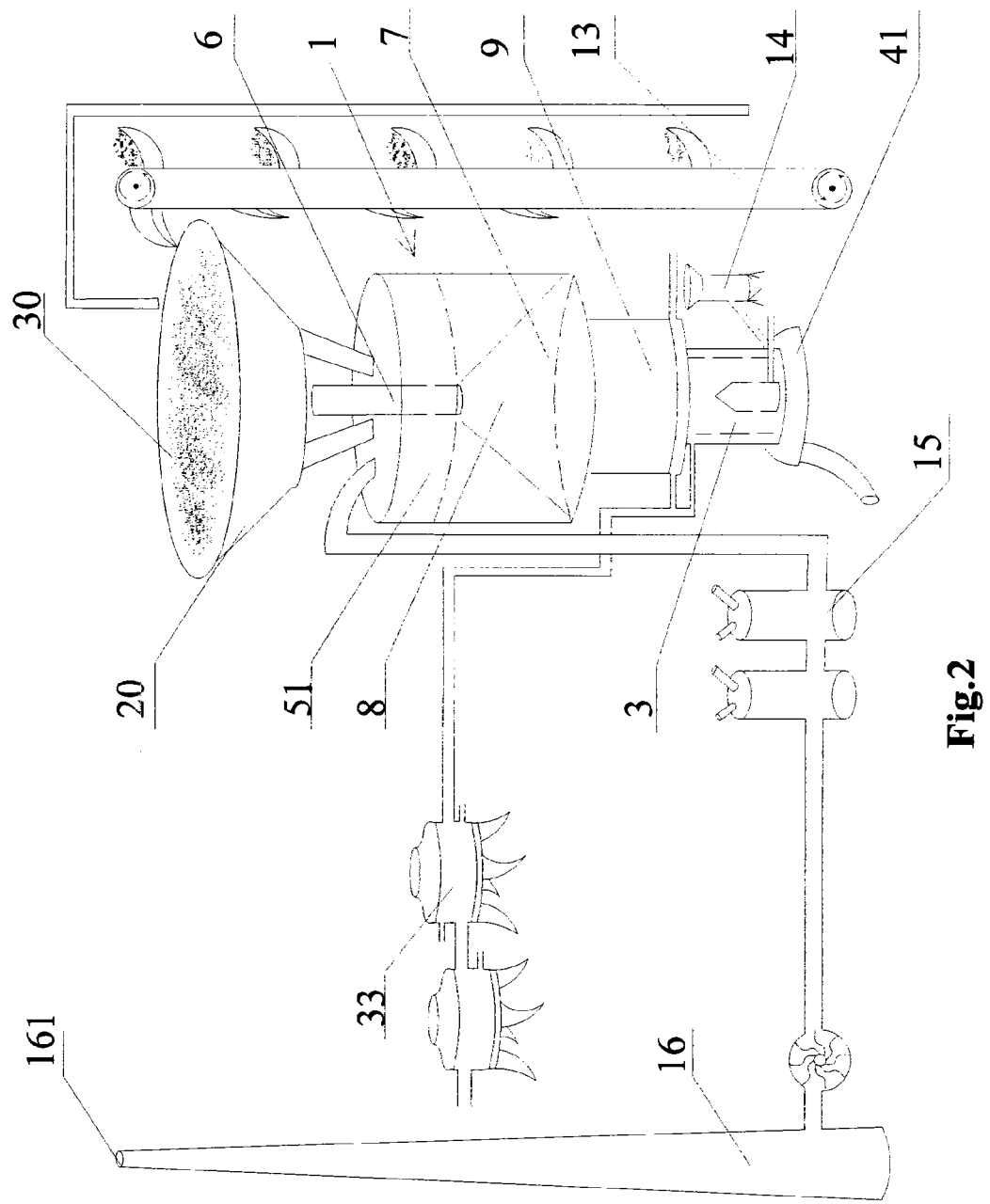
FIG. 2 is a schematic view of the whole structure of the graphitizing furnace according to a schematic embodiment of the present invention.

Referring to FIG. 2, the shaft graphitizing furnace of the present invention comprises a feeding device 13 which transports the material to the feeding inlet 4, and the feeding device 13 can be provided outside the furnace body 1, for example, above the furnace body 1. The feeding device 13 is driven by a hydraulic power or a mechanical power, which will not affect the implementation of the present invention.

The discharging device 41 is provided at the bottom of the graphitizing furnace, for example, provided below the discharging outlet 5 and connected with it. The discharging device can automatically discharge the material using an automatic control system, for example, a hydraulic or mechanical power is used for driving it to realize automatic discharging.

The raw materials of the present invention can be calcined petroleum coke, electrically calcined coal, process metallurgical coke, carbon materials or other graphitizable materials, which will not affect the implementation of the present invention.

Furthermore, referring to FIG. 2, the shaft high temperature continuous graphitizing furnace further comprises a flue 16 connected with the furnace body and a desulfurizing device connected between the flue and the furnace body. The desulfurizing device may comprise a desulfurizing water tower. Moreover, the flue performs dust removal and desulfurization to smoke through the desulfurizing device using a dual-alkali water curtain, and the desulfurizing device 15 uses sodium carbonate and sodium hydroxide to regenerate clean water. The desulfurizing device may use an apparatus that is suitable to be provided in the above manner, such as a granite desulfurizing apparatus.

The gas generated during the production is emitted out of the furnace via the dust removal device 14, for example, a bag dust removal device, and the waste gas generated during the production is desulfurated by the desulfurizing device 15 connected with the flue 16 and then emitted out of the furnace via a flue outlet 161. The flue of the furnace body is in a circular four-hole shape, that is, the cross section of the flue is mainly in an annular shape, and four exhaust vents are provided in the side wall of the flue. In this way, the exhausting space is expanded, which helps fully exhaust of the high temperature gas within the furnace body. The shaft high temperature continuous graphitizing furnace according to the present invention can complete a whole process of material feeding, material entering, material preheating, material graphitizing, material cooling and material discharging and processing of the waste gas, which is safe and applicable, mature in technology, stable in product quality, and can save energy and reduce emission.

The working principle of the desulfurizing device 15 is as follow: smoke containing dust and sulfur oxides enters the desulfurizing device 15 via the flue, alkaline absorption solution containing the ion OH— is sprayed out of a spiral nozzle of the desulfurizing device 15 to form multiple rows of high speed atomized water curtains in opposite direction to the smoke, which ensures the dust removal and desulfurization effect of the desulfurizing device 15 by the increasing of the collision probability that the dust and sulfur oxides collide with the water and very high gas-liquid relative speed utilizing the speed of atomized liquid drops. The desulfurized waste water is emitted via bottom overflow holes and then enters a precipitating pool to precipitate, neutralize and regenerate, circularly using though the dual-alkali method. The purified gas is emitted via the upper portion of the flue, thereby achieving the purpose of dust removal, desulfurization and prevention of waste gas.

The process of the sodium-calcium dual-alkali method to neutralize the desulfurized waste water is as follow: for sodium salts are easily dissolved in water, within the desulfurizing device 15 sodium alkali is used to absorb $SO_2$, and the desulfurized liquid after the absorption is regenerated in a regenerating pool using cheap lime, thus sodium ions are recycled. The basic chemical principle can be divided into a desulfurizing process and a regenerating process:

I Desulfurizing Process:

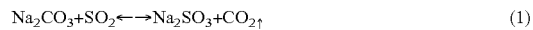

$$Na_2CO_3 + SO_2 \leftrightarrow Na_2SO_3 + CO_2 \uparrow \qquad (1)$$

$$2NaOH + SO_2 \leftrightarrow Na_2SO_3 + H_2O \qquad (2)$$

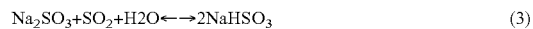

$$Na_2SO_3 + SO_2 + H_2O \leftrightarrow 2NaHSO_3 \qquad (3)$$

The above three equations are different in view of the pH value of the absorbing liquid: the equation (1) is a starting reaction equation of the absorption; when the pH value is relatively high (pH>9), equation (2) is the main reaction; when the pH value is lowered to be neutral or even acid (5<PH<9), the reaction of the equation (3) occur.

II Regenerating Process:

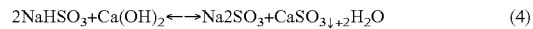

$$2NaHSO_3 + Ca(OH)_2 \leftrightarrow Na2SO_3 + CaSO_3 \downarrow + 2H_2O \qquad (4)$$

$$Na_2SO_3 + Ca(OH)_2 \leftrightarrow 2NaOH + CaSO_3 \downarrow \qquad (5)$$

The $Ca(OH)_2$ slurry (in which $Ca(OH)_2$ is saturated) is added into the desulfurized absorption liquid, and a neutral (amphoteric) $NaHSO_3$ soon reacts with the lime slurry delivered into the desulfurized absorption liquid at a fixed quantity, and then the pH value of the circulating liquid increases. The $HSO^3$ is neutralized to generate $SO_3^{2-}32-$, then part of the generated $SO_3^{2-}32-$ reacts with $Ca_2+$ in the lime slurry, and semi-hydrated calcium sulfite generated during the reaction is precipitated slowly and is discharged from the system. So that the ions in the absorption liquid keep balance in concentration, the absorption liquid resumes the ability of absorbing $SO_2$ and is recycled.

From the above description it can be seen that the above embodiment of the present invention achieves the following technical effects:

1. In the shaft high temperature continuous graphitizing furnace of the present invention, for a perpendicularly placed column electrode is used as the upper electrode and a horizontally placed annular hollow electrode is used as the lower electrode, an umbrella shaped high temperature area is formed between the electrode pair, and the natural flow law of an object is utilized to make raw materials pass a high temperature graphitizing area and then discharged, which ensures the quality of the product.

2. Within the closed furnace body, a high temperature pre-heating area is naturally formed at the upper portion of the umbrella shaped high temperature area to preheat the raw materials effectively. Therefore, the thermal energy is used efficiently, the energy is saved prominently and the power consumption per ton is only 1460 KW.

3. The closed structure of the furnace body allows no impurities to be blended into the raw materials during the graphitizing process, thereby obtaining high product purity; for material of the lining of the furnace body is carbon composite material, it effectively improves the life cycle of the furnace body.

4. A high temperature buffer segment is used to gradually lower the temperature of the product. A circulating water cooling device is used to further cool the product, which achieves the effects of low cost, small consumption, and avoiding the produce of excessive waste gas and pollution to the environment.

5. The furnace body is connected with the flue to guide the high temperature waste gas collectively. An environmentally friendly desulfurizing system is mounted and circulating dual alkali water is used to perform desulfurization and dust removal to the high temperature waste gas. Therefore, green and sustainable produce can be achieved.

Described above is just a preferable embodiment of the present invention and is not intended to restrict the present invention. For those skilled in the art, the present invention may have various changes and variations. Any modifications, equivalent substitutions, improvements and etc. within the spirit and principle of the present invention shall all be included in the scope of protection of the present invention.

The invention claimed is:

1. A shaft high temperature continuous graphitizing furnace, comprising: a closed furnace body, a cooling area below the furnace body, a discharging outlet below the cooling area, a discharging device connected with the discharging outlet, a cooling system connected with the cooling area, a flue connected with the furnace body, and a desulfurizing device connected between the flue and the furnace body;

wherein the furnace body comprises a shaft cylindrical structure, a feeding inlet at an upper end thereof, and an electrode pair;

wherein the electrode pair comprises an upper electrode located at the top of the furnace body and a lower electrode located at the bottom of the furnace body, configured to form an umbrella or truncated cone shaped electric field having a lower cross section area greater than its upper cross section area between the upper electrode and the lower electrode that forms a high temperature area around the discharging outlet which ensures raw materials in the area can be heated during falling; and wherein the flue of the furnace body is in a circular four-hold shape, and the discharging device uses an automatic control system.

2. The shaft high temperature continuous graphitizing furnace according to claim 1, wherein the electrode pair is graphite electrode, the upper electrode is a perpendicularly placed column electrode, and the lower electrode is a horizontally placed annular hollow electrode.

3. The shaft high temperature continuous graphitizing furnace according to claim 2, wherein the electrode pair is distributed at the center axis of the furnace body.

4. The shaft high temperature continuous graphitizing furnace according to claim 3, wherein the cooling system is a circulating water cooling system.

5. The shaft high temperature continuous graphitizing furnace according to claim 4, further comprising a feeding device which conveys materials to the feeding inlet, and the feeding device being disposed outside the furnace body and driven by hydraulic power or mechanical power.

6. The shaft high temperature continuous graphitizing furnace according to claim 5, further comprising a high temperature buffer area connected between the furnace body and the cooling area.

7. The shaft high temperature continuous graphitizing furnace according to claim 1, wherein the flue performs dust removal and desulfurization to smoke through the desulfurizing device using a dual-alkali water curtain, and the desulfurizing device uses sodium carbonate and sodium hydroxide to regenerate clean water.

8. The shaft high temperature continuous graphitizing furnace according to claim 1, wherein a high power direct current transmission manner is adopted between the upper electrode and the lower electrode to form an umbrella or truncated cone shaped electric field.

9. The shaft high temperature continuous graphitizing furnace according to claim 1, wherein the feeding inlet and the furnace body form an inverted umbrella or inverted truncated cone shaped material falling area.

* * * * *